United States Patent [19]

Stedronsky

[11] Patent Number: 5,098,569
[45] Date of Patent: Mar. 24, 1992

[54] SURFACE-MODIFIED SUPPORT MEMBRANE AND PROCESS THEREFOR

[75] Inventor: Erwin R. Stedronsky, Richmond Heights, Mo.

[73] Assignee: Monsanto Company, St. Louis, Mo.

[21] Appl. No.: 627,093

[22] Filed: Dec. 13, 1990

[51] Int. Cl.$^5$ .................... B01D 67/00; B01D 71/10; B01D 71/12; B01D 71/26
[52] U.S. Cl. .................... 210/500.29; 210/500.36; 210/500.41; 264/45.1
[58] Field of Search ............. 210/490, 500.29–500.32, 210/500.41, 500.42, 500.35, 639, 500.36; 264/41, 45.1, DIG. 48, DIG. 62

[56] References Cited

U.S. PATENT DOCUMENTS 4,873,033 10/1989 Heckmann et al. ................. 210/490

*Primary Examiner*—Frank Sever
*Attorney, Agent, or Firm*—Charles E. Smith; Paul L. Passley; James C. Bolding

[57] ABSTRACT

A surface-modified support membrane is disclosed wherein the membrane coating is resistant to cleaning agents such as surfactants and solvents. Also disclosed is a process for preparing such membranes. The subject membranes have a modifying polymer irreversibly adsorbed onto essentially all of the surface area thereof, which modifying polymer is uniformly cross-linked.

17 Claims, No Drawings

SURFACE-MODIFIED SUPPORT MEMBRANE AND PROCESS THEREFOR

BACKGROUND OF THE INVENTION

1. Field of the Invention

The present invention relates to a process for surface modifying support membranes and to new and improved membranes produced from such process. More particularly, the present invention relates to a process for preparing a surface-modified support membrane wherein an activated modifying polymer is irreversibly adsorbed onto essentially all of the surface area of the membrane. The coated membrane is subsequently treated under conditions which effect substantially uniform cross-linking of the modifying polymer by way of the activated portions. In a particularly preferred embodiment, a uniform layer of a chlorohydrin-functionalized hydroxypropylcellulose material is irreversibly adsorbed onto essentially all of the surface area of a porous hollow fiber membrane. The chlorohydrin moiety is then converted to the corresponding epoxide which subsequently reacts with the hydroxyl groups of adjacent HPC molecules in order to cross-link the monolayer of HPC. The resulting coating membrane is resistant to cleaning agents such as surfactants, solvents, and caustics.

2. Prior Art

Ultrafiltration and microfiltration membranes utilized in industry, particularly in the food processing industry, and in environmental applications are typically hydrophobic membranes which may be surface-modified with a hydrophilic material to reduce fouling. Such membranes are known to foul after a certain period of use. When such membranes are utilized in a manufacturing facility, attempts are made to clean the membranes rather than replace them. Preferred cleaning methods include washing with sodium hydroxide, with surfactants, and/or with aqueous ethanol. Although some coatings are stable to the sodium hydroxide wash, washing with ethanol, which is a preferred cleaning method in the food processing industry, removes the hydrophilic coating. Thus, there is a need for membranes which are stable to ethanol.

U.S. Pat. No. 4,794,002 discloses a process for irreversibly adsorbing a modifying polymer onto a support surface. This process involves soaking the support membrane in a solution of the modifying polymer dissolved in an appropriate solvent for a period of time sufficient for the modifying polymer to adsorb onto the support membrane. The resulting modified membranes are then washed with excess solvent. This particular process is suitable for surface modifying a variety of polymeric support surfaces by irreversibly adsorbing thereon a suitable modifying polymer which possesses the desired chemical characteristics. For example, a fabric made of a polymeric material such as nylon can be surface modified to increase its ability to wet and thereby render clothes made of such a modified fabric more comfortable. Employing this process, one can surface modify and render substantially hydrophilic various laboratory and medical devices which often are made of hydrophobic polymeric materials which interact undesirably with protein material. The surface modifications can be further stabilized by cross-linking or can be derivatized in order to incorporate desired reactive groups, such as, for example, ion exchange groups, e.g., derivatized using chloroacetic acid. However, the cross-linking is accomplished by depositing a cross-linking agent onto a deposited layer of polymeric material. For example, ethylene glycol diglycidyl ether, or epichlorohydrin, in 1N NaOH is deposited onto a layer of modifying material. In order to deposit the cross-linking agent, however, a solvent evaporation process is utilized. This results in a nonuniform distribution of the agent and loss of the agent during the evaporation process. Furthermore, the degree of cross-linking is dependent upon, among other things, the solubility of the cross-linking agent and the boiling point thereof in relation to that of the solvent.

U.S. Pat. No. 4,618,533 discloses surface modified membranes having passivation coatings which membranes are prepared by wetting a polymeric porous membrane and coating directly onto the entire surface thereof a monomer grafted and cross-linked in situ onto the membrane. Such membranes are prepared utilizing high concentrations of a free radical initiator and heating the monomer-containing membrane for a short period of time, such as from 2 to 30 minutes, at a temperature between 60° and 95° C. Polymerization in this manner is extremely difficult to control and membranes resulting from such process do not have a uniform coating. Furthermore, the flow characteristics of such membranes are significantly reduced.

Cross-linking of hydroxypropylcellulose is typically accomplished utilizing toluene diisocyanate (TDI) or dimethylolurea (DMU). However, the cross-links which result are hydrolytically unstable and therefore continuously bleed hydrolysis products into the process streams. TDI results in the release of 1,3-diaminobenzene and DMU results in the release of formaldehyde. Obviously, neither of these hydrolysis products would be toxicologically desirable in either a food processing or a biological application.

BRIEF DESCRIPTION OF THE INVENTION

The present surface modification process involves irreversibly absorbing an "activated" modifying polymer, such as a chlorohydrin derivative of a polymeric surface-modifying material, onto essentially all of the surface area of a hydrophobic polymeric support surface. The surface-modified support is then subjected to conditions wherein the "activated" modifying polymer cross-links. For example, where the support membrane is surface-modified with a chlorohydrin derivative of a polymeric surface-modifying material, the chlorohydrin functionality is converted to the corresponding epoxide, and the support membrane is subsequently subjected to conditions wherein the epichlorohydrin reacts to cross-link the modifying polymer. The resulting new and improved membranes are characterized in that they contain a monolayer of a uniformly cross-linked modifying polymer which is resistant to cleaning agents and the like, such as ethanol.

DETAILED DESCRIPTION OF THE INVENTION

The present invention is directed to surface-modified support membranes wherein a uniform layer of an activated modifying material is irreversibly adsorbed onto essentially all of the surface area thereof and subsequently uniformly cross-linked through the activated portions. As utilized herein, the term "activated" means having a cross-linking agent covalently attached thereto such that the material to which the agent is bonded is adapted to be cross-linked without utilizing an additional cross-linking agent. For clarity and brevity in the delineation of the invention, the following description will be primarily directed toward surface modified semipermeable membranes. It should be understood that the parameters described below can be employed to surface modify nonmembrane polymeric surfaces.

Support membranes which can be surface modified according to the teachings of the present invention can be made of essentially any polymeric material capable of being fabricated into a membrane with adequate mechanical strength. Particularly appropriate support membranes for surface modification according to the present invention can be made from a number of polymers, preferably but not limited to hydrophobic polymers such as, for example, polysulfone, polyethersulfone, poly(2,6-dimethyl, 4-phenylene oxide) and derivatives thereof, polyamides, polyimides, polyetherimide, polypropylene, polyethylene, polyvinylidene fluoride, and the like. It should be understood that suitable support polymers may include mixtures and blends of the above polymers as well as other hydrophobic polymers. Particularly preferred polymers for support membranes are polysulfone, polyethersulfone and polypropylene. Preferably, these membranes are porous enough on at least one surface such that the modifying polymer can diffuse through the surface pores to treat the interior of the membrane. Support membranes can be macro-void containing or macro-void free. By "macro-void free" is meant that the membrane is lacking of voids greater than about 20 times the pore size of the immediately contiguous portion of the membrane. Many methods for making porous membranes from hydrophobic polymers are known to those skilled in the art of membrane manufacture. These methods include phase inversion using nonsolvents or temperature and the stretching of microcrystalline films. Phase inversion using nonsolvents involves dissolving the polymer in a solvent, forming a membrane sheet or tube by extrusion through a die, and contacting the extruded polymer solution with a liquid which is a nonsolvent for the polymer but is miscible with the solvent. The polymer solution gels and, when the solvent is extracted, a porous structure remains. In the case of some polymers which are not soluble in a wide variety of solvents (e.g., polypropylene), a pore-forming material can be identified which forms a single phase solution when mixed with the polymer in the melt, but which is immiscible with the polymer at lower temperatures. A melt containing a mixture of the polymer and the pore-forming agent, is then extruded through a die at a temperature above the phase inversion temperature, the extrudate is cooled to a temperature below the phase inversion temperature, and the solution gels. The pore-forming agent is then removed by evaporation or washing. Yet another method for forming porous membranes, when the polymer is capable of forming microcrystals, involves extrusion of the polymer melt under conditions which induce the microcrystalline regions to form, then drawing the crystallized film to produce pores between the crystalline regions. These techniques are discussed in more detail in "Synthetic Polymeric Membranes: A Structural Perspective", Second Edition, by Robert E. Kesting, published by Wiley-Interscience (New York, 1985).

The polymeric modifying material is one which is adapted to be "activated", as described below, and which is adapted to be irreversibly adsorbed onto essentially all of the surface area of the support membrane. Characteristics necessary for irreversible adsorption are set forth in detail in U.S. Pat. No. 4,794,002 which is incorporated herein by reference. Preferred polymeric modifying materials are dextran, methyl cellulose, ethyl cellulose, ethyl hydroxyethyl cellulose, hydroxypropyl cellulose, amylose, amylopectin and polyvinyl alcohol.

The modifying polymer is "activated" by reacting the modifying polymer with a substituted oxirane in an inert solvent and in the presence of a Lewis acid catalyst. Suitable substituted oxiranes include those represented by the formula:

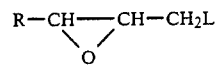

wherein R represents hydrogen or a straight-chain or branched alkyl radical having from 1 to about 6 carbon atoms; and L represents a leaving group such as, for example, a halide selected from bromide and chloride, tosylates, mesylates, and the like. Preferred leaving groups are halides. Suitable Lewis acid catalysts include boron trifluoride, either as a gas or as an etherate, (e.g., boron trifluoride etherate) HCl, zinc tetrafluoroborate, and perchloric acid. Suitable inert solvents include methylene chloride, dimethylformamide, N-methylpyrolidone, tetrahydrofuran, dioxane, hexane, toluene and the like. The resulting product is an activated modifying polymer containing from about 0.001 to about one halohydrin group per each hydroxyl group attached to the monomer unit of modifying polymer.

The amount of activated polymer to be adsorbed onto the support membrane can be calculated as exemplified below for a fiber. The specific adsorption capacity of a particular fiber for an activated modifying polymer is estimated by first depositing a nonactivated modifying polymer, e.g., hydroxypropylcellulose, according to the procedure in U.S. Pat. No. 4,794,002. The surface-modified polymers are then washed, dried and assayed to determine the amount of modifying polymer irreversibly adsorbed onto the surface of the fiber. This assay involves a spectrophotometric determination of the colored products resulting from the reaction of anthrone in concentrated mineral acid with the deposited polysaccharide. The amount of deposited modifying polymer combined with the measured void volume of the fiber is then used to calculate the proper concentration of activated polymer to be deposited.

Following activation of the modifying polymer, and calculation of the amount of activated polymer to be deposited, the activated modifying polymer can be deposited onto the support membrane according to the procedure set forth in U.S. Pat. No. 4,794,002 which is incorporated herein by reference. Thus, the support membrane is brought into contact with a solution containing from about 0.1 to about 10 wt. % of the activated modifying polymer. The resulting support membrane therefore has a uniform layer of activated modifying polymer irreversibly adsorbed onto essentially all of the surface area thereof.

Alternatively, the fiber can be imbibed with the activated modifying polymer. As utilized herein, the term "imbibing" refers generically to methods utilized to introduce the solutions of modifying polymer and other agents into the pores of the porous support membrane. There are several methods of imbibing. Two of such methods, namely, convective imbibing and diffusive imbibing, are preferred. Convective imbibing depends upon a pressure differential to force a solution into and through the porous wall of the fiber. The pressure differential can be established by vacuum wherein the dry fiber is immersed in the solution and the head space over the solution is evacuated to a pressure which is lower than the vapor pressure of the solvent system. This allows low pressure air trapped in the pores of the fiber to exchange with solvent vapor. When the head space is returned to ambient pressure, liquid solvent replaced the solvent vapor, and carries with it the dissolved materials. Diffusive imbibing involves immersing a membrane, fully wetted with a first solution, in a second solution and permitting substances dissolved in the second solution to diffuse into the pores of the membrane under the influence of an appropriate concentration gradient. Diffusive imbibing preferably involves wetting the dry, unmodified membrane with, for example, methanol or mixtures of methanol-water, and then immersing it in the solution. Those skilled in the art will recognize that the time period will vary depending on the modifying polymers in solution, the size and structure of the membrane pores and the like. The methanol diffuses out of the porous wall and the activated modifying polymer solution diffuses into the pores. Different fibers respond to these imbibing methods differently. However, it is within the skill of one skilled in the art of membrane surface modification to identify which method is best for a particular membrane. A preferred method for porous polysulfone membranes is rewetting by vacuum imbibing followed by introduction of the activated modifying polymer into the membrane by diffusive imbibing. The vacuum imbibing procedure should be carried out for a period of time ranging from about 1 to about 30 minutes, preferably from about 2 to about 20 minutes. The diffusive imbibing procedure should be carried out for a period of time from about 0.5 to about 20 hours, preferably from about 1 to about 2 hours.

Following the imbibing procedure, excess polymer solution is drained off and the fibers are washed in solvent for about ten minutes at ambient temperature. The surface-modified support membrane is then treated, such as by diffusive imbibing with a base under conditions which will convert the halohydrin back to the oxirane. Suitable bases include sodium hydroxide, sodium carbonate, sodium bicarbonate and the corresponding potassium and calcium equivalents, and organic bases such as diisopropylethylamine and the like. Preferred treatment is conducted utilizing aqueous sodium bicarbonate, followed by a water rinse and flash evaporation.

The support membrane is then treated again with a suitable Lewis acid catalyst, which can be selected from those described above, in order to catalyze the reaction between the oxirane and other functional groups of the modifying polymer, such as other hydroxyl groups of hydroxypropylcellulose. Thus, cross-linking occurs under acidic conditions.

The resulting surface-modified support membrane is characterized by having a substantially uniform monomolecular layer of a modifying polymer irreversibly adsorbed onto essentially all of the surface area thereof, which modifying polymer is substantially uniformly cross-linked. Where the modifying polymer is one of the preferred polymers set forth above activated with a substituted oxirane, the resulting membrane is further characterized by having a uniform distribution of ether linkages, resulting from cross-linking, which linkages are stable to both acids and bases. Uniform cross-linking is shown by washing the surface-modified polymers with a 70% (v/v) aqueous ethanol solution at room temperature. If the modifying polymer is uniformly cross-linked, less than about 50%, preferably less than about 25 wt. % (based on the weight of the deposited modifying polymer which is initially present) of the modifying polymer will be removed by the wash. Most preferably, less than about 10 wt. % of the modifying polymer will be removed by the wash.

EXAMPLE 1

This example illustrates methods for activating a modifying polymer.

A. Homogeneous Reaction

Boron trifluoride etherate (1.60 ml, d 1.125 g/ml, 12.5 mmole) added to methylene chloride (500 ml) contained in a 1000 ml round bottomed flask fitted with a mechanical stirrer and blanketed with nitrogen. Hydroxypropylcellulose (MW 100,000, Eq. Wt. 335, D.S. 3, 18.6 g., 50 mmole) sifted into the flask with vigorous stirring to produce dispersed gel particles. Chloromethyloxirane [epichlorohydrin] (9.25 g., d 1.18 g/ml, 7.84 ml, 100 mmole) added in one portion, and the mixture was stirred at room temperature for 48 hours during which time the amount of visible gel particles decreases. Ethanol (500 ml) was added in one portion and the mixture stirred until a homogeneous solution was obtained. The methylene chloride was substantially removed from this solution by concentration on the rotary evaporator. Two further portions of ethanol (250 ml each) were added and evaporated to remove additional methylene chloride, and to finally yield 257.5 g of solution containing 27.9 g. of product.

B. Heterogeneous Reaction

Hydroxypropylcellulose (MW 1,000,000, Eq. Wt. 335, D.S. 3, 125 g., 375 mmole) was suspended with vigorous stirring in cyclohexane (450 ml) contained in a 1000 ml three-neck round bottomed flask fitted with a heating mantle, internal thermometer, mechanical stirrer, reflux condenser, and a nitrogen blanket. Chloromethyloxirane [epichlorohydrin] (MW 92.5, 24.25 g, 262 mMole) was diluted with 50 ml cyclohexane and added in one portion. The mixture was stirred for 16 hours at room temperature. Boron trifluoride etherate (MW 141.9, 5.31 g, 37.4 mMole) was added dropwise, and the mixture was stirred for 16 hours at room temperature. The mixture was refluxed for 15 minutes, cooled to room temperature, and filtered through a Buchner funnel. The product was washed on the funnel with diethyl ether. The product was suspended with stirring in 600 ml of diethyl ether overnight at room temperature and isolated by filtration. This process was repeated once more before drying in a vacuum oven at 35° C. to yield 81 grams of product.

C. Heterogeneous Reaction

Epichlorohydrin (6.9 g, 75 mMole) was dissolved in cyclohexane (120 ml) in a 500 ml Erlenmeyer flask. Hydroxypropylcellulose (33.5 g, 100 meq, 300,000 MW) was added in one portion and the mixture stirred at ambient temperature overnight. Cyclohexane (80 ml) was added to the flask before boron trifluoride etherate (1.25 ml, 1.41 g, d 1.125, 10 mMole) diluted with ether (10 ml) was added in one portion. The mixture was heated to 40°–45° C. for about 5 minutes, and the mixture was then permitted to stand at ambient temperature for 4 hours. The solid product was filtered on a Buchner funnel, rinsed with ether (ca. 150 ml), and extracted for 2 hours in a Soxhlet apparatus with ether. A sample of this washed product was retained, dried, and assayed as described below. The remainder of this product was slurried in a solution of boron trifluoride etherate (0.5 ml) in ether (150 ml) for one hour at ambient temperature. The product was filtered and dried in a vacuum oven overnight at ambient temperature. Long term storage of the reacidified product is best accomplished at less than 5° C.

Assay

A sample (ca. 1 g) of a product of the epichlorohydrin activated HPC was dissolved in ethanol (75 ml) with stirring. Distilled water (10 ml) and 0.25 N sodium hydroxide solution (10.00 ml) was added in one portion and the mixture stirrer for 5 minutes at room temperature. The excess sodium hydroxide was back titrated using 0.1 N hydrochloric acid to phenolphthalein end point. The equivalent weight of the above prepared material was calculated to be 1050, corresponding to a degree of substitution of 0.35.

EXAMPLE 2

The adsorption capacity of a particular fiber for HPC derivatives is estimated by depositing unmodified HPC via the procedure set forth in U.S. Pat. No. 4,794,002, washing and drying the fibers, and assaying the HPC deposited onto the fiber using the anthrone assay described below. This datum combined with the measured void volume of the particular fiber is used to calculate the proper concentration of epi-HPC to be used in the following coating procedure. These concentrations often fall into the range of 0.25-1.0% w/v, but they may fall outside this range in the case of special fibers depending on the internal surface area and void volume of the fibers.

The anthrone assay involves the following:

A stock solution of anthrone reagent was prepared by dissolving anthrone (40 mg) in diluted sulfuric acid (100 ml, 80% w/w). A standard solution of modifying polysaccharide is prepared at a concentration of 100-300 micrograms per milliter, using water, reagent alcohol, or mixtures thereof as solvent.

A sample of coated fiber 25 cm long was sliced open axially, was cut into pieces, each 1 cm. long, and was placed into a 125 ml Erlenmeyer flask. To this flask was added 5.0 ml of concentrated hydrochloric acid, (37% w/w), 20.0 ml of diluted sulfuric acid (80% w/w), and 5.0 ml of the same solvent used to prepare the standard solution of modifying polysaccharide. A reagent blank and a polysaccharide standard are run simultaneously with the fiber sample. The mixtures were heated for 10 minutes in a boiling water bath.

The mixtures were cooled to room temperature before 20.0 ml of stock anthrone reagent and 0.5 ml formic acid (88% w/w) were added to the flasks. The mixtures were heated for 12 minutes in a boiling water bath, cooled to room temperature, and degassed by stirring vigorously before determining optical densities at 608 nm. Standard techniques are used to calculate the amount of modifying polysaccharide present on the fiber sample.

The dry fiber is vacuum imbibed with 0.5% w/v epi-HPC dissolved in ethanol-water 80% v/v. The fibers may be handled as either a loose hank or may be assembled into a flat mat assembled with vinyl tape. The fibers are drained and the bores are cleared. Optionally, the completeness of the imbibing operation may be quality controlled by weighing the imbibed fiber and comparing the weight gain against an expected weight gain calculated from the tare weight of the fiber, the density of the imbibing solution, and the total void volume of the fiber.

The imbibed fiber is then washed by nutating in ethanol-water 20% v/v for 10 minutes at ambient temperature. Washing is repeated four times. The fibers are then air dried at ambient temperature. The dried fibers are then diffusion imbibed with 50 mM sodium bicarbonate solution and permitted to soak for 10 minutes at ambient temperature. The imbibed fiber is then washed by nutating in distilled water for 10 minutes. Washing is repeated three times.

The washed fiber is drained and transferred to a vacuum-oven where they are flash vacuum evaporated to a final system pressure of less than 50 mTorr. After flash vacuum evaporation, the oven chamber is backfilled with nitrogen to approximately 400 Torr total pressure. During this backfilling operation 1 ml of liquid boron trifluoride etherate is also introduced into the oven. This is most conveniently accomplished by loading the liquid into a sample loop attached to a sampling valve installed in the nitrogen feed line.

The fibers are baked at 100° C. for one hour. The baked fibers are removed from the oven and are stored dry at room temperature without special precautions.

EXAMPLE 3

This example illustrates the stability of the coating of the surface-modified membranes prepared according to the teachings of the present invention. Comparisons are made to the coating of the membranes prepared according to U.S. Pat. No. 4,794,002 and to the teachings of the present invention except that a mixture of epoxide and modifying polymer is substituted for the covalently activated modifying polymer.

A membrane was passivated with HPC under the conditions set forth in U.S. Pat. No. 4,794,002, and then the HPC was cross-linked using a difunctional epoxide. Ethyleneglycol diglycidyl ether, EDGE, was deposited onto the HPC coated membrane, solvent was removed and the fiber dried, and the residual EDGE was activated under catalysis with vapors of boron trifluoride etherate. The dry reaction conditions insured that the only hydroxyl groups available for reaction with the EDGE were those present on the HPC. Parasitic side reactions of the EDGE cross-linker with the hydroxyl groups of water were thus minimized.

In the second approach, a membrane was treated with an "epi-HPC" activated modifying polymer, the pendant chlorohydrins on the "epi-HPC" closed to epoxides with aqueous bicarbonate, the membrane dried, and the pendant epoxides activated under catalysis with vapors of boron trifluoride etherate. "Epi-HPC" is a derivative of hydroxypropylcellulose which has been activated with chloromethyloxirane, epichlorohydrin, under conditions which lead to a linear soluble product.

Four samples of fibers were prepared as described in Example 1: bare fiber, standard HPC coated fiber, EDGE cross-linked HPC coated fiber, and "epi-HPC" cross-linked coated fiber. The quantity of HPC present on the fibers was assayed using the anthrone assay. The nonspecific adsorption of protein was assayed by depletion of a pH 7 cytochrome C solution initially at 250 μg/ml after soaking for 16 hours. The modified anthrone assay is a colorimetric analytical technique for quantitating polysaccharides insolubulized onto fiber surfaces.

Three sets of washing experiments were performed on the coated fibers. An uncoated fiber was included as a control. Coated fibers were challenged by washing with water, with ethanol-water 70% vol/vol, and with 1% aqueous Triton X-100 surfactant followed by ethanol-water 70% vol/vol. The results of these experiments are recorded in Table 1.

The monolayer coverage was determined from the B.E.T. surface area of this fiber as determined by adsorption of Krypton, its linear density, and the molecular dimensions of the HPC monomer unit.

Results of the comparisons are reported in Table 1.

Several comments need to be made regarding the data presented in Table 1. The standard HPC coating on fiber effectively reduces nonspecific adsorption of cytochrome C by a factor of 23X compared to the bare fiber. However, a single wash with 70% ethanol removes about half of the HPC and results in a nonspecific adsorption of about half of that observed for the bare fiber. Furthermore, the percentage of the HPC coating which is removed from the fiber which has an EDGE-cross-linked coating is indicative of nonuniform cross-linking, i.e., only certain portions of the applied HPC coating are stabilized.

with 1% aqueous Triton X-100 and/or ethanol-water 70% v/v.

A membrane was passivated with HPC under the conditions set forth in U.S. Pat. No. 4,794,002. It was then soaked for 16 hours at room temperature in a solution (5% w/v) of epichlorohydrin in 1 N aqueous sodium hydroxide, washed four times by nutating for 15 minutes in water, and air dried. Three sets of washing experiments were performed on the fibers and the nonspecific adsorption of protein and the quantity of polysaccharide remaining on the fiber were assayed as described above. The results of these experiments are reported in Table 2.

TABLE 2

Adsorption of Cytochrome C Onto HPC Passivated Fiber

| Fiber | | Wash: Water | Wash: EtOH-Water 70% v/v | | Wash: 1% aq. Triton X-100; then EtOH-Water 70% v/v | |
|---|---|---|---|---|---|---|
| Bare Fiber | HPC: | -0- μg/cm-fiber | not determined | | not determined | |
| | Cyto C: | 12.6 ± 0.2 μg/cm-fiber | | | | |
| Std HPC; then crosslinked in aq. NaOH with Epichlorohydrin | HPC: | 24.3 μg/cm-fiber | HPC: | 10.8 μg/cm-fiber | HPC: | 7.6 μg/cm-fiber |
| | Cyto C: | 1.3 ± 0.3 μg/cm-fiber | Cyto C: | 8.6 ± 0.2 μg/cm-fiber | Cyto C: | 11.2 ± 0.2 μg/cm-fiber |

What is claimed is:

1. A surface-modified support membrane comprising a polymeric support membrane having a substantially uniform monomolecular layer of a modifying polymer irreversibly adsorbed onto essentially all of the surface area thereof, said modifying polymer being substantially uniformly cross-linked sufficient to provide substantial ethanol stability.

2. The membrane of claim 1 wherein said polymeric support membrane is hydrophobic.

3. The membrane of claim 1 wherein said polymeric support membrane is made of a polymer selected from the group consisting of polysulfone, polyethersulfone, polyetherimide, polypropylene, polyethylene and polyvinylidene fluoride.

4. The membrane of claim 1 wherein said modifying

TABLE 1

Adsorption of Cytochrome C Onto HPC Passivated Fiber

| Fiber | | Wash: Water | | Wash: EtOH-Water 70% v/v | | Wash: 1% aq. Triton X-100; then EtOH-Water 70% v/v | |
|---|---|---|---|---|---|---|---|
| Bare, Untreated | HPC: | -0- μg/cm-fiber | | HPC: | -0- μg/cm-fiber | HPC: | -0- μg/cm-fiber |
| | Monolayer: | 0.00 | | Monolayer: | 0.00 | Monolayer: | 0.00 |
| | Cyto C: | 11.4 ± 0.3 μg/cm-fiber | | Cyto C: | 12.1 ± 0.6 μg/cm-fiber | Cyto C: | 13.3 ± 0.4 μg/cm-fiber |
| Standard HPC | HPC: | 29.3 μg/cm-fiber | | HPC: | 13.1 μg/cm-fiber | HPC: | 8.0 μg/cm-fiber |
| | Monolayer: | 1.21 | | Monolayer: | 0.54 | Monolayer: | 0.33 |
| | Cyto C: | 0.5 ± 0.1 μg/cm-fiber | | Cyto C: | 5.1 ± 0.4 μg/cm-fiber | Cyto C: | 9.0 ± 0.2 μg/cm-fiber |
| EDGE Cross-linked | HPC: | 29.4 μg/cm-fiber | | HPC: | 19.0 μg/cm-fiber | HPC: | 14.8 μg/cm-fiber |
| | Monolayer: | 1.21 | | Monolayer: | 0.79 | Monolayer: | 1.47 |
| | Cyto C: | 1.5 ± 0.1 μg/cm-fiber | | Cyto C: | 3.9 ± 1.2 μg/cm-fiber | Cyto C: | 4.3 ± 0.5 μg/cm-fiber |
| "Epi-HPC" Cross-linked | HPC: | 38.4 μg/cm-fiber | | HPC: | 32.6 μg/cm-fiber | HPC: | 35.6 μg/cm-fiber |
| | Monolayer: | 1.59 | | Monolayer: | 1.35 | Monolayer: | 1.47 |
| | Cyto C: | 1.3 ± 0.2 μg/cm-fiber | | Cyto C: | 1.3 ± 0.1 μg/cm-fiber | Cyto C: | 2.6 ± 0.3 μg/cm-fiber |

EXAMPLE 4

This example illustrates the instability of the coating of the surface-modified membranes prepared according to U.S. Pat. No. 4,794,002 when such coating is treated with epichlorohydrin and aqueous base and challenged polymer is selected from the group consisting of dextran, methyl cellulose ethyl cellulose, ethyl hydroxyethyl cellulose, hydroxypropyl cellulose, amylose, amylopectin, and polyvinyl alcohol.

5. The membrane of claim 4 wherein said modifying polymer is substantially uniformly cross-linked through ether linkages.

6. The membrane of claim 1 wherein said support membrane is made of polysulfone.

7. The membrane of claim 6 wherein said modifying polymer is hydroxypropyl cellulose.

8. The membrane of claim 1 wherein greater than about 50% wt. of said cross-linked modifying polymer remains adsorbed to said membrane after washing said surface-modified membrane at room temperature with a 70% (v/v) aqueous ethanol solution.

9. The membrane of claim 1 wherein greater than about 75 wt. % of said cross-linked modifying polymer remains adsorbed to said membrane after washing said surface-modified membrane at room temperature with a 70% (v/v) aqueous ethanol solution.

10. The membrane of claim 1 wherein greater than about 90 wt. % of said cross-linked modifying polymer remains adsorbed to said membrane after washing said surface-modified membrane at room temperature with a 70% (v/v) aqueous ethanol solution.

11. A process for preparing a surface-modified membrane of claim 1 comprising:
  a) activating a modifying polymer to produce an activated modifying polymer having activated portions;
  b) surface-modifying a support membrane by irreversibly adsorbing said activated modifying polymer onto a support membrane to produce a substantially uniform monomolecular layer of the activated modifying polymer irreversibly adsorbed onto essentially all of the surface area of said membrane;
  c) subjecting the surface-modified membrane of Step b) to conditions which effect cross-linking of the activated modifying polymer through the activated portions thereof.

12. The process of claim 11 wherein said activated modifying polymer is prepared by reacting a polymer selected from the group consisting of dextran, methyl cellulose, ethyl cellulose, ethyl hydroxyethyl cellulose, hydroxypropyl cellulose, amylose and polyvinyl alcohol with a substituted oxirane in an inert solvent and in the presence of a Lewis acid catalyst.

13. The process of claim 12 wherein said oxirane is an epihalohydrin.

14. The process of claim 12 wherein said Lewis acid catalyst is selected from the group consisting of HCl, zinc tetrafluoroborate, an etherate, and perchloric acid.

15. The process of claim 13 wherein said Lewis acid is boron trifluoride etherate.

16. The process of claim 12 wherein the support membrane is porous.

17. The process of claim 16 wherein said activated modifying polymer is irreversibly adsorbed onto essentially all of the surface area of said porous support membrane to produce a surface-modified support membrane and said surface-modified support membrane is treated first with a base to convert the halohydrin to an oxirane and then with a Lewis acid catalyst to effect cross-linking of the activated modifying polymer through the oxirane.

* * * * *